(12) United States Patent
Xia et al.

(10) Patent No.: US 11,921,400 B2
(45) Date of Patent: Mar. 5, 2024

(54) HIGH-PRECISION ROTATION SPEED MEASUREMENT METHOD BASED ON FEMTOSECOND OPTICAL FREQUENCY COMB

(71) Applicant: Beijing Changcheng Institute of Metrology & Measurement, AVIC, Beijing (CN)

(72) Inventors: Chuanqing Xia, Beijing (CN); Tengfei Wu, Beijing (CN); Jibo Han, Beijing (CN); Chunbo Zhao, Beijing (CN)

(73) Assignee: Beijing Changcheng Institute of Metrology & Measurement, AVIC, Beijing (CN)

(*) Notice: Subject to any disclaimer, the term of this patent is extended or adjusted under 35 U.S.C. 154(b) by 0 days.

(21) Appl. No.: 18/054,811

(22) Filed: Nov. 11, 2022

(65) Prior Publication Data
US 2023/0070024 A1     Mar. 9, 2023

(30) Foreign Application Priority Data
Feb. 7, 2022   (CN) .................. 202210115517.X

(51) Int. Cl.
G02F 1/35          (2006.01)

(52) U.S. Cl.
CPC .......... *G02F 1/353* (2013.01); *G02F 2203/56* (2013.01)

(58) Field of Classification Search
CPC ......... G02F 1/353; G02F 2203/56; G01P 3/36
See application file for complete search history.

(56) References Cited

U.S. PATENT DOCUMENTS

| 5,610,705 A | * | 3/1997 | Brosnan | ................ | G01S 17/89 |
| | | | | | 356/28.5 |
| 5,745,226 A | * | 4/1998 | Gigioli, Jr. | ............ | G01S 11/12 |
| | | | | | 356/28 |

FOREIGN PATENT DOCUMENTS

| CN | 203720351 U | * | 7/2014 | ............. G01S 17/02 |
| CN | 109556593 A |   | 4/2019 |  |
| CN | 110006418 A |   | 7/2019 |  |
| CN | 111751834 A | * | 10/2020 | ............. G01S 17/08 |

OTHER PUBLICATIONS

Chen W., et al., English Translation for CN-111751834-A, published Oct. 9, 2020, 6 pages. (Year: 2020).*
Ding J., et al., English Translation for CN-203720351-U, published Jul. 16, 2014, 4 pages. (Year: 2014).*

* cited by examiner

*Primary Examiner* — Daniel Petkovsek

(57) ABSTRACT

A rotation speed measurement method based on a femtosecond optical frequency comb is provided. In the method, a rotation axis of a rotating object to be measured and an optical path main axis are coplanar, and perpendicular to each other, and a first converging lens focuses an emitting beam obtained by expanding the laser on a surface of the rotating object. A repetition frequency and a carrier-envelope offset frequency of the femtosecond optical frequency comb are locked during the measurement. A repetition frequency difference is read from a frequency counter. A rotation speed of the rotating object is calculated as follows:

$$M = \frac{c\Delta f_r}{4\pi f_r \sin\alpha R} = \kappa \frac{\Delta f_r}{R}.$$

3 Claims, 2 Drawing Sheets

HIGH-PRECISION ROTATION SPEED MEASUREMENT METHOD BASED ON FEMTOSECOND OPTICAL FREQUENCY COMB

CROSS-REFERENCE TO RELATED APPLICATIONS

This application claims the benefit of priority from Chinese Patent Application No. 202210115517.X, filed on Feb. 7, 2022. The content of the aforementioned application, including any intervening amendments thereto, is incorporated herein by reference in its entirety.

TECHNICAL FIELD

This application relates to laser measurement, and more particularly to a high-precision rotation speed measurement method based on a femtosecond optical frequency comb.

BACKGROUND

The precise measurement of the rotation speed is of considerable significance in many fields. Currently, the rotation speed is measured mainly by a photoelectric code disk speed measurement method, a centrifugal speed measurement method, a flash tachometer-based speed measurement method, a magnetic flux leakage-based speed measurement method, or a hall element-based speed measurement method. However, these methods are limited by contact measurement, narrow measurement range, or the requirement of additional devices such as sensors on the rotating mechanism. By comparison, the laser Doppler velocimetry has advantages of non-contact measurement, fast dynamic response, large measurement range and high accuracy, and has been extensively investigated.

The laser Doppler effect is the frequency change of light waves detected by the receiver when there is relative motion between the light source, the receiver, and the moving object. Since the Doppler shift is very small compared with the light wave frequency of the light source, the heterodyne laser Doppler velocimetry is mostly used in the actual measurement. Unfortunately, the frequency instability of the light source still limits the accuracy and measurement range of the rotation speed measurement. In addition, in order to eliminate the fundamental frequency interference, it is generally necessary to introduce an optical frequency modulator to shift the emitted laser of the light source, which will increase the system complexity and introduce additional frequency uncertainty. It is urgently needed to improve the accuracy of the laser Doppler velocimetry to meet requirements of the high-precision rotation speed measurement.

SUMMARY

In view of the deficiencies in the prior art, this application provides a high-precision rotation speed measurement method based on a femtosecond optical frequency comb, which can achieve the high-precision and high-sensitivity rotation speed measurement, and enable the high-resolution recognition of tiny changes in the repetition frequency caused by Doppler shift caused by the rotation of a target object. Moreover, this method further has simple operation, and the device involved therein has a simple structure.

Technical solutions of this application are described as follows.

This application provides a rotation speed measurement method, a measurement system used in the rotation speed measurement method including a femtosecond optical frequency comb, a laser beam expander, a polarization beam splitter, a quarter-wave plate, a first converging lens, a second converging lens, a first photodetector, a second photodetector, an electrical mixer, and a frequency counter; and the rotation speed measurement method including:

(S1) outputting, by the femtosecond optical frequency comb, a first laser; expanding, by the laser beam expander, the first laser into an emitting beam; allowing the emitting beam to pass through the polarization beam splitter, the quarter-wave plate, and the first converging lens sequentially, wherein an angle between a fast axis of the quarter-wave plate and a horizontal polarization direction of the polarization beam splitter is 45°; focusing, by the first converging lens, the emitting beam on a surface of a rotating object to be measured, and collecting scattered light from the surface of the rotating object to be measured; allowing the scattered light to pass through the quarter-wave plate, and to be reflected by the polarization beam splitter to the second converging lens; and focusing, by the second converging lens, the scattered light on the first photodetector;

(S2) outputting, by the femtosecond optical frequency comb, a second laser; receiving directly, by the second photodetector, the second laser; measuring, by the second photodetector, a repetition frequency $f_r$ of the femtosecond optical frequency comb; measuring, by the first photodetector, a repetition frequency $f_r'$ of the femtosecond optical frequency comb after scattered by the rotating object to be measured; and inputting the repetition frequency $f_r$ and the repetition frequency $f_r'$ to the electrical mixer, and measuring, by the frequency counter, a repetition frequency difference $\Delta f_r$; and (S3) calculating a rotation speed M of the rotating object to be measured according to the repetition frequency difference $\Delta f_r$;

In an embodiment, the repetition frequency difference $\Delta f_r$ is directly proportional to the rotation speed M of the rotating object to be measured;

the femtosecond optical frequency comb comprises a plurality of longitudinal modes evenly spaced apart, and an electromagnetic field of the femtosecond optical frequency comb is expressed as formula (1):

$$E(t) = \sum_{n=-\infty}^{+\infty} e^{-i2\pi(nf_r+f_0)t}; \quad (1)$$

wherein $f_r$ is the repetition frequency of the femtosecond optical frequency comb; $f_0$ is a carrier-envelope offset frequency of the femtosecond optical frequency comb; the femtosecond optical frequency comb is superposition of a series of lasers with a frequency component of $nf_r+f_0$; $A_n$ is a complex amplitude of a corresponding frequency component; when the femtosecond optical frequency comb is focused on the surface of the rotating object, individual frequency components of the femtosecond optical frequency comb will produce a doppler shift according to Doppler effect; and for a laser with a frequency of f, a doppler shift $\Delta f$ is expressed as formula (2):

$$\Delta f = \frac{2fv\sin\alpha}{c}; \quad (2)$$

wherein v is a linear velocity at the surface of the rotating object to be measured; c is light speed; α is equal to half of a focused beam angle; and for a laser with a certain frequency, the doppler shift Δf is directly proportional to the linear velocity at the surface of the rotating object to be measured;

by substituting the formula (2) into the formula (1), an expression of the femtosecond optical frequency comb after being scattered by the rotating object to be measured is expressed as formula (3):

$$E'(t) = \sum_{n=-\infty}^{+\infty} B_n e^{-i2\pi[nf_r(1+\frac{2v\sin\alpha}{c})+f_0(1+\frac{2v\sin\alpha}{c})]t}; \quad (3)$$

$B_n$ is a complex amplitude of a corresponding frequency component of the scattered light; as indicated by the formula (3), after being scattered by the rotating object to be measured, the repetition frequency of the femtosecond optical frequency comb changes, and the repetition frequency $f_r'$ is expressed as formula (4):

$$f_r' = f_r\left(1 + \frac{2v\sin\alpha}{c}\right); \quad (4)$$

Doppler effect causes shift of the repetition frequency of the femtosecond optical frequency comb, and the repetition frequency difference $\Delta f_r$ is expressed as formula (5):

$$\Delta f_r = f_r' - f_r = \frac{2vf_r \sin\alpha}{c}; \quad (5)$$

a relationship between the linear velocity and the rotation speed M is expressed as formula (6), wherein R is a radius of the rotating object to be measured, and the rotation speed M is in revolutions per second:

$$v = 2\pi RM \quad (6);$$

the formula (6) is substituted into the formula (5) to obtain formula (7):

$$\Delta f_r = \frac{4\pi RM f_r \sin\alpha}{c}; \quad (7)$$

wherein the repetition frequency difference $\Delta f_r$ is directly proportional to the rotation speed M of the rotating object to be measured; and the formula (7) is converted into formula (8) to calculate the rotation speed M from the repetition frequency difference $\Delta f_r$:

$$M = \frac{c\Delta f_r}{4\pi f_r \sin\alpha R} = \kappa \frac{\Delta f_r}{R}; \quad (8)$$

wherein κ is a scale factor, and expressed as follows:

$$\kappa = \frac{c}{4\pi f_r \sin\alpha}; \quad (9)$$

wherein the scale factor κ is calculated according to formula (9), or based on a slope of a curve of a rotation speed of a standard rotating object whose rotation speed is known versus the repetition frequency difference $\Delta f_r$.

In an embodiment, a rotation axis of the rotating object to be measured is coplanar with an optical path main axis, and is perpendicular to the optical path main axis; and the repetition frequency $f_r$ and the carrier-envelope offset frequency $f_0$ of the femtosecond optical frequency comb are locked.

In an embodiment, the repetition frequency $f_r$ and the carrier-envelope offset frequency $f_0$ of the femtosecond optical frequency comb are phase locked to a microwave atomic clock or an optical frequency standard. The locked repetition frequency has high stability, is generally better than $10^{-11}$, and even better than $10^{-15}$ when locked on a fountain clock. Thus, the tiny change in the repetition frequency caused by Doppler shift caused by the rotation of the object can be detected with high resolution, and the measurement system has a very high sensitivity and accuracy.

Compared to the prior art, this application has the following beneficial effects.

1. In the method of this application, the doppler shift measurement of laser frequency in the traditional laser Doppler velocimetry is converted into the measurement of the repetition frequency difference in a radio frequency domain, such that the optical heterodyne detection is not required, which can significantly simplify the optical path structure and reduce the complexity of signal processing.

2. By means of the high stability of the repetition frequency of the femtosecond optical frequency comb, the method can improve the sensitivity and accuracy of the rotation speed measurement and achieve the high-resolution detection for tiny changes in the repetition frequency caused by Doppler shift caused by the rotation of the rotating object, and the measurement results can be traced to the SI (International System of units) base unit of time.

In the figures: 1-femtosecond optical frequency comb; 2-laser beam expander; 3-polarization beam splitter; 4-quarter-wave plate; 5-first converging lens; 6-second converging lens; 7-first photodetector; 8-second photodetector; 9-electrical mixer; 10-frequency counter; and 11-rotating object to be measured.

DETAILED DESCRIPTION OF EMBODIMENTS

The disclosure will be further described in detail in conjunction with the accompanying drawings and embodiments.

Figure 1:
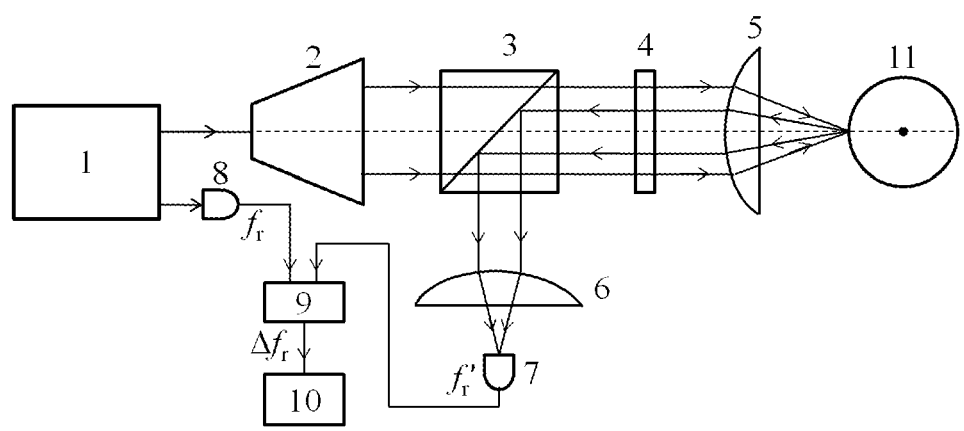
FIG. 1 schematically shows a structure of a high-precision rotation speed measurement system based on a femtosecond optical frequency comb according to one embodiment of the present disclosure.

Provided herein is a high-precision rotation speed measurement method based on a femtosecond optical frequency comb. As shown in FIG. 1, a measurement system used in the method includes a femtosecond optical frequency comb 1, a laser beam expander 2, a polarization beam splitter 3, a quarter-wave plate 4, a first converging lens 5, a second converging lens 6, a first photodetector 7, a second photodetector 8, an electrical mixer 9, and a frequency counter 10.

Specifically, the femtosecond optical frequency comb 1 output a first laser, and the first laser is expanded by the laser beam expander 2 into an emitting beam with large diameter, and then the emitting beam passes through the polarization beam splitter 3, the quarter-wave plate 4, and the first converging lens 5 sequentially. Specifically, an angle between a fast axis of the quarter-wave plate 4 and a horizontal polarization direction of the polarization beam splitter 3 is 45°. The first converging lens 5 focuses the emitting beam on a surface of a rotating object to be measured 11 and collects scattered light from the surface of the rotating object to be measured 11. After the scattered light passes through the quarter-wave plate 4, the scattered light will be reflected by the polarization beam splitter 3, and then focused on the first photodetector 7 by the second converging lens 6. The femtosecond optical frequency comb 1 further outputs a second laser, and the second laser is directly received by the second photodetector 8. The second photodetector 8 detects a repetition frequency $f_r$ of the femtosecond optical frequency comb 1, the first photodetector 7 detects a repetition frequency $f_r'$ after scattered by the rotating object to be measured 11, the repetition frequency $f_r$ and the repetition frequency $f_r'$ are input to the electrical mixer 9, and a repetition frequency difference $\Delta f_r$ is measured by the frequency counter 10.

The femtosecond optical frequency comb 1 in this embodiment is an erbium-doped fiber femtosecond optical frequency comb with a repetition frequency of 100 MHz. The locked reference standard is the rubidium atomic clock. The stability of the locked repetition frequency with a sampling time of 1 s is $6.5 \times 10^{-12}$. The magnification of the laser beam expander 2 is 50 times, the diameter of the emitting beam after expansion is about 3 cm, and the polarization beam splitter 3, the quarter-wave plate 4, the first converging lens 5 and the second converging lens 6 are all greater than 3 cm.

In order to obtain the scale factor $\kappa$ in formula (8), the measurement method and the measurement device of the disclosure are used to measure a rotating flywheel with a constant speed, and by fitting the curve of the rotation speed and the repetition frequency difference, the scale factor $\kappa=1.373854$ (unit: revolution·m) in formula (8) is obtained.

Figure 2:
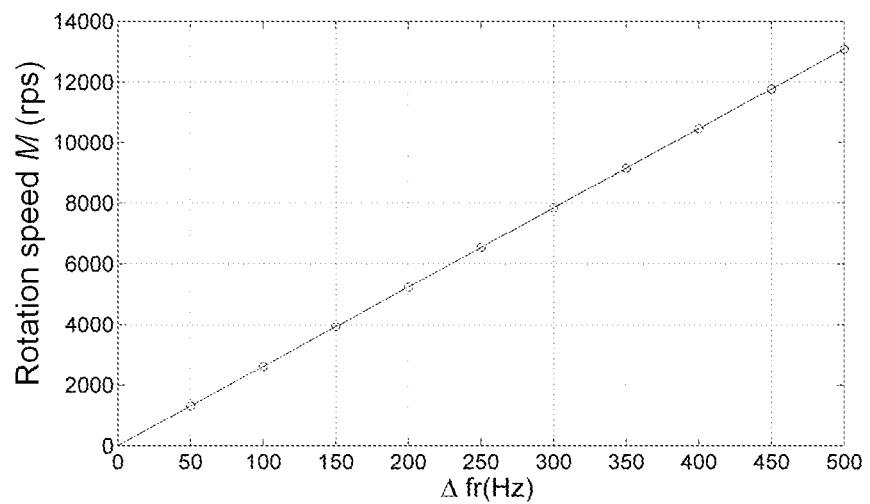
FIG. 2 shows a relationship between a repetition frequency difference and a rotation speed of a rotating object to be measured according to one embodiment of the present disclosure.

The relationship between the repetition frequency difference and the rotation speed in this embodiment is shown in FIG. 2.

In this embodiment, the rotating object to be measured is a flywheel with a diameter of 10.5 cm and driven by a high-speed and high-precision motor. The measurement steps are described as follows.

(1) The rotation axis of the flywheel is coplanar with the optical path main axis, and perpendicular to the optical path main axis. The emitting beams are focused by the first converging lens 5 on the surface of the flywheel. (2) The repetition frequency $f_r$ and the carrier-envelope offset frequency $f_0$ of the femtosecond optical frequency comb 1 are locked. (3) The repetition frequency difference $\Delta f_r$ is read from the frequency counter 10. (4) The rotation speed M of the flywheel is calculated via the formula (8).

The objects, technical solutions and beneficial effects of the disclosure have been described in detail above in conjunction with the embodiments. Described above are merely preferred embodiments of the disclosure, which are not intended to limit the disclosure. It should be understood that any modifications and replacements made by those skilled in the art without departing from the spirit of the disclosure should fall within the scope of the disclosure defined by the appended claims.

What is claimed is:

1. A rotation speed measurement method, a measurement system used in the rotation speed measurement method comprising a femtosecond optical frequency comb, a laser beam expander, a polarization beam splitter, a quarter-wave plate, a first converging lens, a second converging lens, a first photodetector, a second photodetector, an electrical mixer, and a frequency counter; and the rotation speed measurement method comprising:

(S1) outputting, by the femtosecond optical frequency comb, a first laser; expanding, by the laser beam expander, the first laser into an emitting beam; allowing the emitting beam to pass through the polarization beam splitter, the quarter-wave plate, and the first converging lens sequentially, wherein an angle between a fast axis of the quarter-wave plate and a horizontal polarization direction of the polarization beam splitter is 45°; focusing, by the first converging lens, the emitting beam on a surface of a rotating object to be measured, and collecting scattered light from the surface of the rotating object to be measured; allowing the scattered light to pass through the quarter-wave plate, and to be reflected by the polarization beam splitter to the second converging lens; and focusing, by the second converging lens, the scattered light on the first photodetector;

(S2) outputting, by the femtosecond optical frequency comb, a second laser; receiving directly, by the second photodetector, the second laser; measuring, by the second photodetector, a repetition frequency $f_r$ of the femtosecond optical frequency comb; measuring, by the first photodetector, a repetition frequency $f_r'$ of the femtosecond optical frequency comb after scattered by the rotating object to be measured; and inputting the repetition frequency $f_r$ and the repetition frequency $f_r'$ to the electrical mixer, and measuring, by the frequency counter, a repetition frequency difference $\Delta f_r$; and (S3) calculating a rotation speed M of the rotating object to be measured according to the repetition frequency difference $\Delta f_r$;

wherein the repetition frequency difference $\Delta f_r$ is directly proportional to the rotation speed M of the rotating object to be measured;

the femtosecond optical frequency comb comprises a plurality of longitudinal modes evenly spaced apart, and an electromagnetic field of the femtosecond optical frequency comb is expressed as formula (1):

$$E(t) = \sum_{n=-\infty}^{+\infty} A_n e^{-i2\pi(nf_r+f_0)t}; \qquad (1)$$

wherein $f_r$ is the repetition frequency of the femtosecond optical frequency comb; $f_0$ is a carrier-envelope offset frequency of the femtosecond optical frequency comb; the femtosecond optical frequency comb is superposition of a series of lasers with a frequency component of $nf_r+f_0$; $A_n$ is a complex amplitude of a corresponding frequency component; when the femtosecond optical frequency comb is focused on the surface of the rotating object, individual frequency components of the femtosecond optical frequency comb will produce a doppler shift according to Doppler effect; and for a laser with a frequency off a doppler shift $\Delta f$ is expressed as formula (2):

$$\Delta f = \frac{2fv\sin\alpha}{c}; \quad (2)$$

wherein v is a linear velocity at the surface of the rotating object to be measured; c is light speed; α is equal to half of a focused beam angle; and for a laser with a certain frequency, the doppler shift Δf is directly proportional to the linear velocity at the surface of the rotating object to be measured;

by substituting the formula (2) into the formula (1), an expression of the femtosecond optical frequency comb after being scattered by the rotating object to be measured is expressed as formula (3):

$$E'(t) = \sum_{n=-\infty}^{+\infty} B_n e^{-i2\pi\left[nf_r\left(1+\frac{2v\sin\alpha}{c}\right)+f_0\left(1+\frac{2v\sin\alpha}{c}\right)\right]t}; \quad (3)$$

$B_n$ is a complex amplitude of a corresponding frequency component of the scattered light; as indicated by the formula (3), after being scattered by the rotating object to be measured, the repetition frequency of the femtosecond optical frequency comb changes, and the repetition frequency $f_r'$ is expressed as formula (4):

$$f_r' = f_r\left(1 + \frac{2v\sin\alpha}{c}\right); \quad (4)$$

Doppler effect causes shift of the repetition frequency of the femtosecond optical frequency comb, and the repetition frequency difference $\Delta f_r$ is expressed as formula (5):

$$\Delta f_r = f_r' - f_r = \frac{2vf_r\sin\alpha}{c}; \quad (5)$$

a relationship between the linear velocity and the rotation speed M is expressed as formula (6), wherein R is a radius of the rotating object to be measured, and the rotation speed M is in revolutions per second:

$$v = 2\pi RM \quad (6);$$

the formula (6) is substituted into the formula (5) to obtain formula (7):

$$\Delta f_r = \frac{4\pi RM f_r \sin\alpha}{c}; \quad (7)$$

wherein the repetition frequency difference $\Delta f_r$ is directly proportional to the rotation speed M of the rotating object to be measured; and the formula (7) is converted into formula (8) to calculate the rotation speed M from the repetition frequency difference $\Delta f_r$:

$$M = \frac{c\Delta f_r}{4\pi f_r \sin\alpha R} = \kappa \frac{\Delta f_r}{R}; \quad (8)$$

wherein k is a scale factor, and expressed as follows:

$$\kappa = \frac{c}{4\pi f_r \sin\alpha}; \quad (9)$$

wherein the scale factor κ is calculated according to formula (9), or based on a slope of a curve of a rotation speed of a standard rotating object whose rotation speed is known versus the repetition frequency difference $\Delta f_r$.

2. The rotation speed measurement method of claim 1, wherein a rotation axis of the rotating object to be measured is coplanar with an optical path main axis, and is perpendicular to the optical path main axis; and the repetition frequency $f_r$ and the carrier-envelope offset frequency $f_0$ of the femtosecond optical frequency comb are locked.

3. The rotation speed measurement method of claim 2, wherein the repetition frequency $f_r$ and the carrier-envelope offset frequency $f_0$ of the femtosecond optical frequency comb are phase locked to a microwave atomic clock or an optical frequency standard.

\* \* \* \* \*